(12) United States Patent (10) Patent No.: US 8,296,831 B2
Foley et al. (45) Date of Patent: *Oct. 23, 2012

(54) METHOD AND APPARATUS FOR ENABLING A USER TO SELECT AN AUTHENTICATION METHOD

(75) Inventors: James M. Foley, Peoria, AZ (US); Rick D. Johnson, Peoria, AZ (US); Anant Nambiar, New Rochelle, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/092,820

(22) Filed: Apr. 22, 2011

(65) Prior Publication Data

US 2011/0202978 A1 Aug. 18, 2011

Related U.S. Application Data

(63) Continuation of application No. 10/035,064, filed on Dec. 27, 2001, now Pat. No. 7,941,669.

(60) Provisional application No. 60/259,506, filed on Jan. 3, 2001.

(51) Int. Cl.
*H04L 29/06* (2006.01)
(52) U.S. Cl. .......................................... 726/6; 713/182
(58) Field of Classification Search ........ 726/6; 713/182
See application file for complete search history.

(56) References Cited

U.S. PATENT DOCUMENTS

| | | | |
|---|---|---|---|
| 5,276,444 A | 1/1994 | McNair | |
| 5,475,758 A | 12/1995 | Kikuchi | |
| 5,510,777 A | 4/1996 | Pilc et al. | |
| 5,638,448 A | 6/1997 | Nguyen | |
| 5,740,361 A | 4/1998 | Brown | |
| 5,781,724 A | 7/1998 | Nevarez et al. | |
| 5,784,566 A | 7/1998 | Viavant et al. | |
| 5,950,195 A | 9/1999 | Stockwell et al. | |
| 6,006,228 A | 12/1999 | McCullum et al. | |
| 6,052,468 A | 4/2000 | Hillhouse | |
| 6,055,512 A | 4/2000 | Dean et al. | |
| 6,055,570 A | 4/2000 | Nielsen | |
| 6,091,835 A | 7/2000 | Smithies et al. | |
| 6,102,406 A | 8/2000 | Miles et al. | |
| 6,108,583 A | 8/2000 | Schneck et al. | |

(Continued)

OTHER PUBLICATIONS

USPTO; Notice of Allowance dated Jan. 7, 2011 in U.S. Appl. No. 10/035,064.

(Continued)

*Primary Examiner* — Michael Pyzocha
(74) *Attorney, Agent, or Firm* — Snell & Wilmer L.L.P.

(57) ABSTRACT

The present invention facilitates access to a restricted service related to secure transactions via a network. The present invention allows a user to select a minimum security level of authentication for its own login to a restricted service. The user's selected minimum security level of authentication may be registered in an authentication method system, so that the user must use the selected minimum security level for authentication in order to gain access to the restricted service. Alternatively, the user may specify that the selected minimum security level for authentication may be over-turned by the user, or optionally re-set to a new authentication method depending on the needs of the user. As such, the present invention allows the user the flexibility to select its own authentication method for accessing a restricted service.

19 Claims, 6 Drawing Sheets

U.S. PATENT DOCUMENTS

| | | | |
|---|---|---|---|
| 6,148,402 | A | 11/2000 | Campbell |
| 6,154,777 | A | 11/2000 | Ebrahim |
| 6,160,903 | A | 12/2000 | Hamid et al. |
| 6,226,752 | B1 | 5/2001 | Gupta et al. |
| 6,289,462 | B1 | 9/2001 | McNabb et al. |
| 6,327,628 | B1 | 12/2001 | Anuff et al. |
| 6,351,813 | B1 | 2/2002 | Mooney et al. |
| 6,389,542 | B1 | 5/2002 | Flyntz |
| 6,446,204 | B1 | 9/2002 | Pang et al. |
| 6,606,659 | B1 | 8/2003 | Hegli et al. |
| 6,636,973 | B1 | 10/2003 | Novoa et al. |
| 6,651,168 | B1 | 11/2003 | Kao et al. |
| 6,665,709 | B1 | 12/2003 | Barron |
| 6,668,327 | B1 | 12/2003 | Prabandham et al. |
| 6,711,681 | B1 | 3/2004 | Al-Salqan et al. |
| 6,718,535 | B1 | 4/2004 | Underwood |
| 6,738,907 | B1 | 5/2004 | Carter |
| 6,758,754 | B1 | 7/2004 | Lavanchy et al. |
| 6,766,456 | B1 | 7/2004 | McKeeth |
| 6,772,332 | B1 | 8/2004 | Boebert et al. |
| 6,792,547 | B1 | 9/2004 | Murata et al. |
| 6,853,988 | B1 | 2/2005 | Dickinson et al. |
| 6,865,426 | B1 | 3/2005 | Schneck et al. |
| 6,892,307 | B1 | 5/2005 | Wood et al. |
| 7,093,019 | B1 | 8/2006 | Bertani et al. |
| 7,096,496 | B1 | 8/2006 | Challener et al. |
| 7,103,915 | B2 | 9/2006 | Redlich et al. |
| 7,187,771 | B1 | 3/2007 | Dickinson et al. |
| 7,260,724 | B1 | 8/2007 | Dickinson et al. |
| 7,287,271 | B1 | 10/2007 | Riggins |
| 7,305,562 | B1 | 12/2007 | Bianco et al. |
| 7,336,790 | B1 | 2/2008 | Caronni et al. |
| 7,343,334 | B1 | 3/2008 | Adduci et al. |
| 7,444,368 | B1 | 10/2008 | Wong et al. |
| 7,512,965 | B1 | 3/2009 | Amdur et al. |
| 7,523,067 | B1 | 4/2009 | Nakajima |
| 7,657,490 | B1 | 2/2010 | Nakajima |
| 2001/0054101 | A1 | 12/2001 | Wilson |
| 2001/0056487 | A1 | 12/2001 | Yoo |
| 2002/0059144 | A1 | 5/2002 | Meffert et al. |
| 2002/0073320 | A1 | 6/2002 | Rinkevich et al. |
| 2002/0077083 | A1 | 6/2002 | Zellner et al. |
| 2002/0083179 | A1 | 6/2002 | Shaw et al. |
| 2002/0143960 | A1 * | 10/2002 | Goren et al. .................. 709/229 |
| 2004/0039909 | A1 | 2/2004 | Cheng |
| 2004/0123161 | A1 | 6/2004 | Harada et al. |

OTHER PUBLICATIONS

USPTO; Office Action dated Aug. 12, 2010 in U.S. Appl. No. 10/035,064.
USPTO; Office Action dated Apr. 6, 2010 in U.S. Appl. No. 10/035,064.
USPTO; Advisory Action dated Feb. 3, 2010 in U.S. Appl. No. 10/035,064.
USPTO; Final Office Action dated Dec. 16, 2009 in U.S. Appl. No. 10/035,064.
USPTO; Office Action dated Mar. 23, 2009 in U.S. Appl. No. 10/035,064.
USPTO; Final Office Action dated Sep. 8, 2008 in U.S. Appl. No. 10/035,064.
USPTO; Office Action dated Feb. 28, 2008 in U.S. Appl. No. 10/035,064.
USPTO; Office Action dated Sep. 27, 2007 in U.S. Appl. No. 10/035,064.
USPTO; Advisory Action dated Jun. 20, 2007 in U.S. Appl. No. 10/035,064.
USPTO; Final Office Action dated Feb. 12, 2007 in U.S. Appl. No. 10/035,064.
USPTO; Office Action dated Jul. 14, 2006 in U.S. Appl. No. 10/035,064.
USPTO; Advisory Action dated Jun. 1, 2006 in U.S. Appl. No. 10/035,064.
USPTO; Final Office Action dated Jan. 19, 2006 in U.S. Appl. No. 10/035,064.
USPTO; Office Action dated Aug. 5, 2005 in U.S. Appl. No. 10/035,064.
USPTO; Office Action Restriction dated May 25, 2005 in U.S. Appl. No. 10/035,064.
Yahoo Sign-in and Registration Help archived on Aug. 16, 2000 by archive.org, pp. 1-4.
Microsoft. Enabling and Configuring Authentication. 1999. www.freshinvest.com/iis/htm/core.iiauths.htm.
USPTO; Office Action dated Apr. 10, 2012 in U.S. Appl. No. 13/092,807.
USPTO; Office Action dated Mar. 23, 2012 in U.S. Appl. No. 13/092,810.

* cited by examiner

METHOD AND APPARATUS FOR ENABLING A USER TO SELECT AN AUTHENTICATION METHOD

RELATED APPLICATIONS

This application is a continuation of, and claims priority to, U.S. Ser. No. 10/035,064 entitled "METHOD AND APPARATUS FOR ENABLING A USER TO SELECT AN AUTHENTICATION METHOD" filed on Dec. 27, 2001. The '064 patent application claims priority to, and the benefit of, the U.S. provisional patent application entitled "AUTHENTICATION METHOD DETERMINATION" filed on Jan. 3, 2001 as U.S. Ser. No. 60/259,506. Both of which are hereby incorporated by reference.

FIELD OF INVENTION

The present invention generally relates to facilitating the determination of an authentication method for accessing a restricted service related to transactions via a network, and more particularly, to a system and method for enabling a user to select a minimum security level of authentication for accessing a restricted service in connection with a secure transaction via a network.

BACKGROUND OF THE INVENTION

Various methods of authentication of a user have been used in the past to identify a user, verify information, or allow access to a restricted service or location. For example, obtaining access to a building or an area within a building may require biometric identification of the user. Another example is accessing on-line services which may require a user identifier/identification and password to access a webpage. As used herein, a user typically includes a consumer (e.g., desiring to purchase and/or sell a product, service or other item of commerce). A user may also be a merchant, a distributor, a supplier, a seller, and/or any person or entity desiring to gain access to a restricted service or location.

A number of channels for purchases are available, including entering a merchant location, shop-at-home television networks, call-in responses to television advertisements, and the like. Moreover, many consumers have discovered the convenience and economy of purchasing goods and services directly on-line electronically (commonly called "e-purchases"). In a typical Internet transaction, a consumer generally identifies goods and/or services for purchase by viewing an online advertisement such as a hypertext markup language (HTML) document provided via a World Wide Web (WWW) browser. Payment typically occurs in various ways such as, for example, by utilizing a charge card number that is provided via a secure channel such as a secure sockets layer (SSL) connection that is established between the consumer and the merchant.

Because of the high incidence of fraud in Internet transactions, most charge card issuers consider network transactions to be "Card Not Present" transactions subject to a higher discount rate. Stated another way, because of the increased risk from "Card Not Present" transactions, most charge card issuers charge the merchant a higher rate for accepting card numbers via electronic means than would be charged if the card were physically presented to the merchant. To improve the security deficiencies inherent in transporting charge card numbers over unsecure networks, many have suggested the use of "smart cards". Smartcards typically include an integrated circuit chip having a microprocessor and memory for storing data directly on the card. The data can correspond to a cryptographic key, for example, or to an electronic purse that maintains an electronic value of currency. Many smart card schemes for interne transactions have been suggested in the prior art, but these typically exhibit a marked disadvantage in that they are non-standard and typically require the merchants to obtain new, proprietary software for their Web storefronts to accept the smart card transactions. Moreover, the administration costs involved with assigning and maintaining the cryptographic information associated with smart cards have generally been excessive to date. Additional information relating to smart card and smart card reader payment technology is disclosed in U.S. patent application Ser. No. 09/952,490 filed on Sep. 12, 2001; U.S. patent application Ser. No. 60/232,040, filed on Sep. 12, 2000; and U.S. Pat. Nos. 5,742,845; 5,898,838; and 5,905,908, owned by Datascape; which are hereby incorporated by reference.

Existing digital wallet technology is used to provide a means for users to utilize transaction card products (e.g., credit, charge, debit, and smart cards, account numbers, and the like) to pay for products and services on-line. More details related to digital wallets and smart card technology can be found in U.S. patent application Ser. No. 09/653,837 entitled "Transaction Card" which was filed on Sep. 1, 2000; U.S. patent application Ser. No. 09/652,899 entitled "Method and Apparatus For Conducting Electronic Transactions" filed on Aug. 31, 2000; and U.S. patent application Ser. No. 09/734,098 entitled "Method and Apparatus For Illuminating a Transaction Card" filed Dec. 11, 2000, all of which are herein incorporated by reference. In general, digital wallets are tools which store personal information (name, address, charge card number, credit card number, etc.) in order to facilitate electronic commerce or other network interactions. The personal information can be stored on a general server or at a client location (Personal Computer (PC) or Smartcard) or on a hybrid of both a general server and a client server. Presently, the digital wallet general server is typically comprised of a Web server and a database server which centrally houses the user's personal and credit card information, shopping preferences and profiles of on-line merchants.

A digital wallet preferably performs functions such as single sign on/one password, automatic form filling of check out pages, one or two click purchasing, personalization of web sites, on-line order and delivery tracking, itemized electronic receipts, and customized offers and promotions based upon spending patterns and opt-ins. More particularly, a one-click purchase activates the wallet and confirms the purchase at the same time. A two-click check out first activates the wallet, then the second click confirms the purchase. In use, the wallet bookmark is typically clicked by the user and an SSL session is established with the Wallet server. A browser plug-in is executed and the user supplies a user identification and password or smart card for authentication in order to gain access to the wallet data. When shopping at an on-line merchant, the appropriate wallet data is transferred from the wallet server to the merchant's Web server.

For more information on digital wallet systems, loyalty systems, transaction systems, electronic commerce systems, see, for example, the Shop AMEX™ system as disclosed in U.S. patent application Ser. No. 60/230,190 filed Sep. 5, 2000; the MR as Currency™ and Loyalty Rewards Systems as disclosed in U.S. patent application Ser. No. 09/834,478 filed on Apr. 13, 2001; U.S. patent application Ser. No. 60/197,296 filed on Apr. 14, 2000; U.S. patent application Ser. No. 60/200,492 filed Apr. 28, 2000; U.S. patent application Ser. No. 60/201,114 filed May 2, 2000; a digital wallet system disclosed in U.S. patent application Ser. No. 09/652, 899 filed Aug. 31, 2000; a stored value card as disclosed in U.S. patent application Ser. No. 09/241,188 filed on Feb. 1, 1999; a system for facilitating transactions using secondary transaction numbers disclosed in U.S. patent application Ser. No. 09/800,461 filed on Mar. 7, 2001; U.S. patent application Ser. No. 60/187,620 filed Mar. 7, 2000; U.S. patent application Ser. No. 60/200,625 filed Apr. 28, 2000; and U.S. patent application Ser. No. 60/213,323 filed May 22, 2000; all of which are herein incorporated by reference. Other examples of an online membership reward systems are disclosed in U.S. Pat. No. 5,774,870, issued on Jun. 30, 1998, and U.S. Pat. No. 6,009,412, issued on Dec. 29, 1999, both of which are hereby incorporated by reference.

Existing systems, however, are limited to pre-defined security features and procedures and generally require that a merchant initiate changes to accommodate each different smart card or wallet. Thus, a new system of accessing a restricted service (e.g., conducting electronic transactions) is desired which would allow the user to select the method of authentication and provide improved security with minimal overhead for users and merchants. Moreover, it is desirable that such a new system integrate well with various smart cards and Internet web pages and other services provided by various card issuers and merchants.

SUMMARY OF THE INVENTION

The present invention includes a system and method for selecting at least one authentication method for accessing a restricted service. The system allows a user to select a method of authentication for access to the restricted service, where the restricted service may require at least one of many methods of authentication in order to gain access to it. The system registers the user-selected method of authentication such that gaining access to the restricted service requires the user to use the pre-selected method of authentication. In this way, the user may select the minimum level of security required for authentication in order to access the restricted service. Alternatively, a host may select the minimum level of security required for authentication for accessing the restricted service based on predetermined characteristics of the user.

BRIEF DESCRIPTION OF EXEMPLARY DRAWINGS

The subject invention will hereinafter be described in the context of the appended drawing figures, wherein like numerals denote like elements, and:

DETAILED DESCRIPTION OF EXEMPLARY EMBODIMENTS

Figure 1:
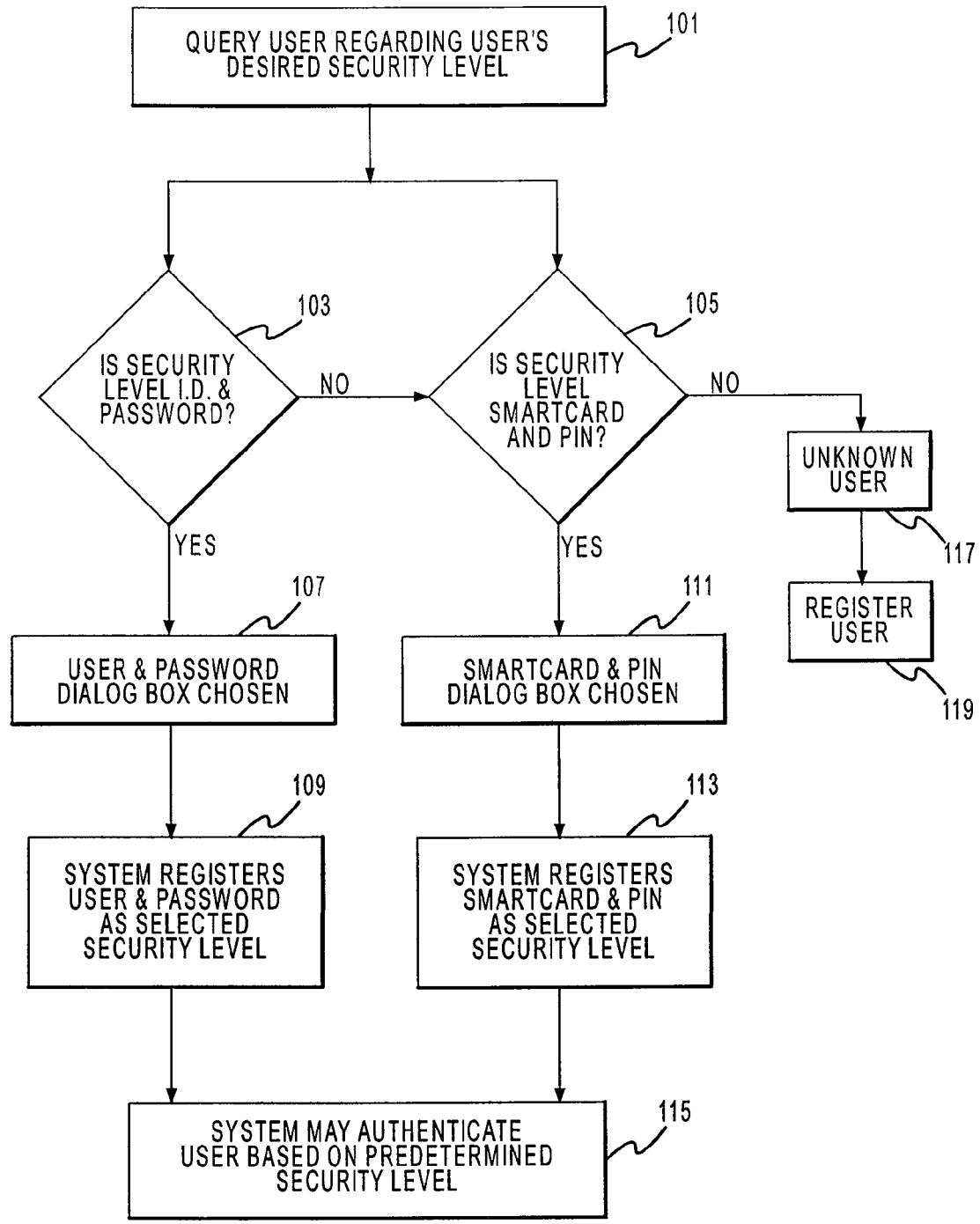
FIG. 1 is a flowchart illustrating a method for enabling a user to select a minimum security level for authentication for its own login in accordance with an exemplary embodiment of the present invention.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as Basic, C, C++, Java, COBOL, assembler, PERL, with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to validate data with a user-side scripting language, such as JavaScript, VBScript or the like.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

To simplify the description of the exemplary embodiments, the present invention is described as pertaining to a system of electronic commerce, e.g., transactions running over the Internet. It will be appreciated, however, that many applications of the present invention could be formulated. For example, the system could be used to authenticate users of a computer system, to activate a passcode system, to access a restricted service or network, to access a building or other restricted area, automobile security and access, or any other purpose. The system may also be used to access on-line services, kiosk services, Point of Sale (POS) terminals, Automatic Teller Machines (ATMs), and/or the like.

Prior art systems typically allow a security administrator to set levels of security or authentication globally or establish the levels for a pre-selected group. FIG. 1 illustrates an exemplary embodiment of the present invention which allows a user to select a minimum security level for authentication for its own login to a restricted service. While using the functionality of this exemplary embodiment of the present invention to access a restricted service (e.g., an on-line service, a website, a webpage, a function, an individual application within a website, and/or the like) or a restricted area, a user is queried regarding the desired level of security for authentication (e.g., the user is queried to select one or more levels of security for authentication via a dialog box) (step 101). The user is typically a consumer desiring to access an on-line service, access a restricted area, purchase and/or sell a product, service or other item of commerce, otherwise transact in commerce, and/or communicate with another entity. The user may alternatively be a merchant, a distributor, a supplier, a person, an entity, software, hardware and/or the like desiring to transact or otherwise communicate with a consumer, a merchant, a distributor, a supplier, a person, an entity, software, hardware and/or the like. The user may interact with the system via any input device such as a computing unit, keyboard, mouse, smart card reader, biometric system, kiosk, personal digital assistant, handheld computer (e.g., Palm® Pilot), cellular phone and/or the like.

The system facilitates a user's selection of a method of authentication for access to the restricted service, wherein the restricted service may require a method of authentication in order to gain access to the restricted service (e.g., the system allows the user to submit a level of security for authentication by entry of the selection into the dialog box) (steps 103-105). Alternatively, a host may select the minimum security level for authentication for the particular user based at least partially upon predetermined characteristics. In this exemplary embodiment of the present invention, the user may select between using a standard user identification and password entry into a user dialog box (step 103) or using a smart card and PIN authentication method (step 105) as the minimum level of security for authentication. For example, a standard user identification and password can be created by the system or chosen by the user. In the same way, a PIN used with a smart card may be generated by the system or chosen by the user. Of course, any method of authentication may be used depending on the needs of the user and the functionality of the system providing the security level. Examples of other authentication methods include user identification and passphrase, biometric with or without a password (e.g., keyboard latency, fingerprint, palm print, eye/retina scan, voice recognition, and/or the like), smart card and digital certificate, Palm® Pilot and digital certificate, sound verification, radio frequency and password, infrared and password, and/or the like.

As such, the system may be configured to use two levels of security for authentication: an item or device (e.g., transaction card) and known/secret information (e.g., password, certificate, etc). In addition, the user may choose to require more than one authentication method (i.e., any number of authentication methods) for each restricted service or access. For example, the restricted service or access may require both the user identification and password and the smart card and PIN authentication methods to gain access.

When accessing a restricted service, a restricted network, a restricted area, a website, a webpage, a function, or an individual application within a website, when activating a service or card, during a registration process or during use of an application, the user is presented with a set-up routine, dialog box or any other system/method for receiving input which requests the user to select a minimum security level for authentication desired by the user (step 101). Once the user selects a method of authentication (e.g., a minimum security level for authentication), then the user selected method of authentication may be registered into the system. The system may be configured such that gaining access to a restricted service or location may require the user selected method of authentication. However, the method of authentication may only be required at certain locations, during certain times of day, during certain days, while the user is a member (or not a member) of a certain group, during certain periods of high security alerts, and/or the like.

If the user chooses a user identification and password level of security for authentication (step 107), then the system registers this level of security for this particular user (step 109). For example, in a charge card website (e.g., www.americanexpress.com), the user may prefer to require only a user identification and password to access the summary of his monthly charge card statement. Alternatively, if the user selects smart card and PIN level of security for authentication (step 111), then the system registers this level of security for this particular user (step 113). In such an exemplary embodiment, the user may prefer to require an advanced security feature for authentication, such as a smart card and PIN or a digital certificate on a smart card with a PIN may be used to access a brokerage account. Thus, the system registers the user selected level of security for the user such that the system may authenticate the user based on the predetermined security level.

If the user does not choose a desired security level for authentication, then the user may be unknown to the system (step 117), so the user is given the option of registering the user in the system (step 119). Once the user registers itself in the system, then the user may begin at step 101 and choose a desired security level for authentication as illustrated. Accordingly, once the user selects a desired security level for authentication, then the system may authenticate the user based on the predetermined security level for authentication (step 115). Thus, the present invention allows a user to select a minimum security level for authentication for her own login.

Figure 2:
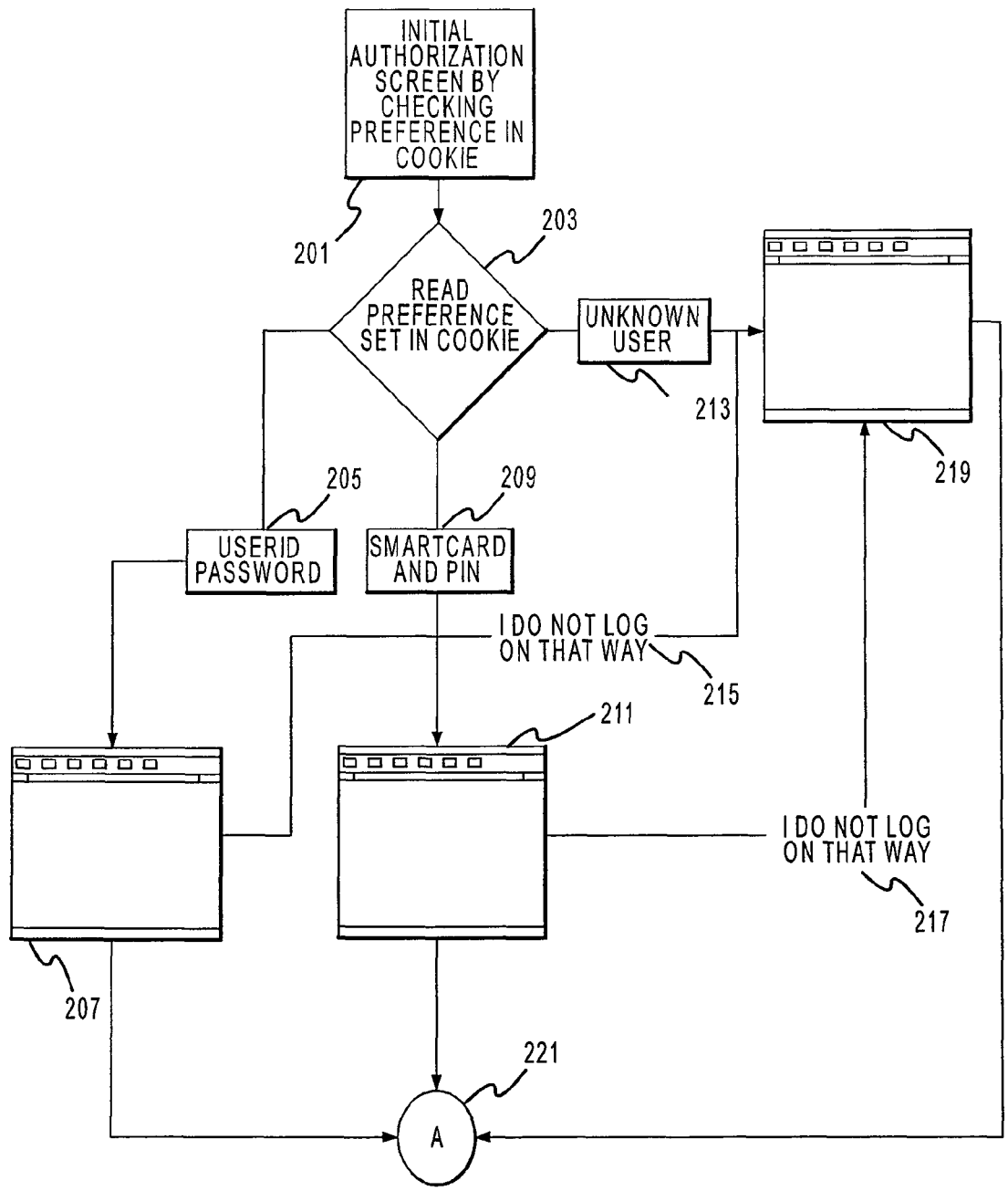
FIG. 2 is a flowchart illustrating a method for enabling a host to determine the minimum security level for authentication for a user based on predetermined characteristics of the user in accordance with an exemplary embodiment of the present invention.

FIG. 2 illustrates an exemplary embodiment of the present invention, where the host may determine the minimum security level for authentication for the user based on predetermined characteristics. A host may be one or more of the following: a server, a personal computer, a mainframe, a distributed network (e.g., the internet), a web service, and/or the like. There are many methods that the host may use in order to determine the user's selected security level for authentication. For example, the host may check for a cookie residing on the user's computing unit, wherein the cookie includes a desired level of authentication (step 201). The cookie resides on the user's computing unit by the user's prior access to the host, registration into the host system, or any other communication between the user and the host. The host may use any other method of identifying the user's selected security level for authentication via any identification method (e.g., profile stored on the host computer, user's personal computer, smart card, digital wallet, Palm® Pilot, and/or the like). The host reads the preference set in the cookie, wherein the cookie includes information regarding the minimum level of security for authentication for the user (step 203). In this way, if the preference set includes information regarding the user's minimum level of security for authentication, the host may request the appropriate authentication information from the user. For example, if the cookie indicates that the user has selected to use the user identification and password authentication method (step 205), then a dialog box requesting a user identification and password is presented to the user via a web page (step 207). If the cookie indicates that the user has selected to use the smart card and PIN authentication method (step 209), then a dialog box requesting a smart card and PIN is presented to the user via a web page (step 211). On the other hand, if the preference set does not include information regarding the user's minimum level of security for authentication (e.g., the user is unknown) (step 213) or the user does not normally use the authentication methods provided by the host (steps 215 and 217), then a dialog box is presented giving the user the option to register with the host and select an authentication method (step 219). For example, the user may be unknown if the user is a new user, the computing unit is new to the host, the user is accessing the host from a computing unit different from its usual point of access, and/or the like. After selecting a minimum level of security for authentication, the user may attempt to access a restricted service using the user selected method of authentication.

If the system has authenticated the user via the user identification and password entry or the smart card and PIN entry, or the user registers to use one of these authentication methods, then the user and the user's authentication method are revealed to the host (step 221). Accordingly, the user is identified and authorized to access the restricted service (step 221). Identification may include retrieving information on the user's profile stored in the host. Thus, the system allows the user to gain access to the restricted service upon authenticating the user pursuant to the selected method of authentication.

Figure 3:
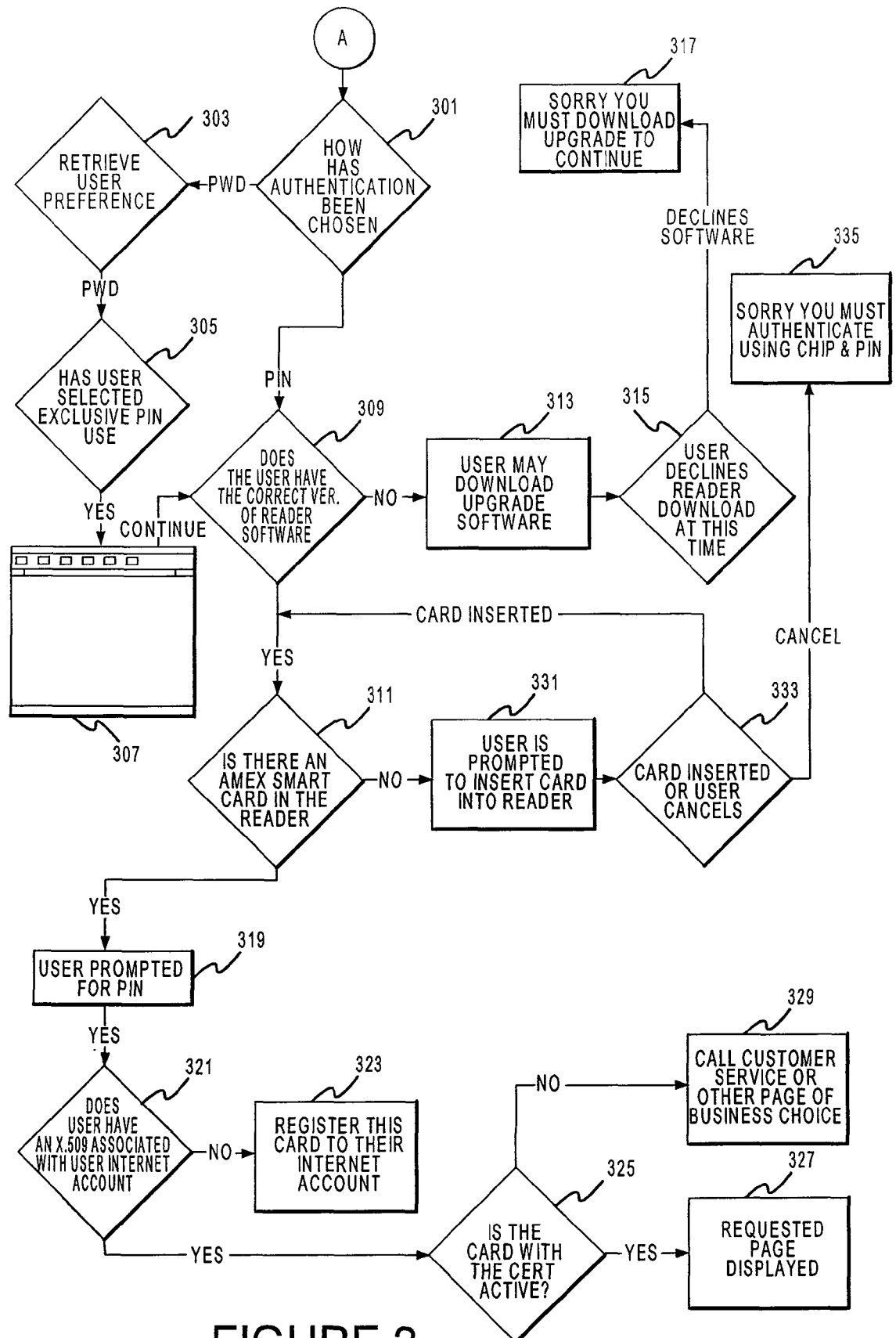
FIG. 3 is a flowchart illustrating a method for determining the authentication method pre-set by a user in accordance with an exemplary embodiment of the present invention.

Once the host has authenticated the user (step 221), the system attempts to determine the user's predetermined method of authentication (step 301 in FIG. 3). FIG. 3 illustrates a method for determining the authentication method pre-set by the user in accordance with an exemplary embodiment of the present invention. The system retrieves a user preference from a database, where the user preference indicates one or more authentication methods pre-set by the user (step 303). For example, if the user has pre-selected the user identification and password method of authentication, then the user preference is the user identification and password method of authentication is retrieved.

The user preference may be stored in a database, and the system may use a database call to confirm the user's pre-selected method of authentication (step 303). A data base call may include, e.g., back-up data, tracking information, and/or the like. A database may be any type of database, such as relational, hierarchical, object-oriented, and/or the like. Common database products that may be used to implement each database include DB2 by IBM (White Plains, N.Y.), any of the database products available from Oracle Corporation (Redwood Shores, Calif.), Microsoft SQL Server by Microsoft Corporation (Redmond, Wash.), or any other database product. Each database may be organized in any suitable manner, including data tables or lookup tables.

The exemplary embodiment illustrated in FIG. 3 assumes that the smart card and PIN authentication method is the user's pre-selected method of authentication (step 305). Of course, any other authorization method can be the user's pre-selected method of authorization depending on the user's needs. In this way, the system prompts the user to input data into the system in connection with the user's pre-set authorization method (step 307). For example, the system prompts the user with a dialog box which requests that the user utilizes the smart card and PIN authentication method to authenticate the user (step 307). Since the user authentication method is the smart card and PIN, a check is made to determine whether the user has a correct version of the smart card reader software (step 309). If the user does not have the correct version of the smart card reader software, then the user may download upgraded software (step 313). Optionally, the user may decline to download the upgraded software (step 315). However, in this exemplary embodiment of the present invention, the user downloads the upgraded software in order to continue (step 317). Of course, the system need not be configured to require the user to download the upgraded software; a different version of the software may optionally be used and the system may be configured to accommodate different versions of the software. If the user has the correct version of the smart card reader software or if the system can operate with previous versions, then a check is made to determine whether a smart card is present in the smart card reader (step 311).

The system accepts data from the user, wherein the data is associated with the user's pre-set authorization method (step 319). For example, if a smart card is present in the smart card reader in step 311, then the user is prompted to input a PIN (step 319). The system verifies the user's data which was input into the system in accordance with the pre-set authorization method (steps 321-331). For example, when the user inputs a PIN, then a check is made to determine whether the user has a digital certificate (e.g., X.509 format) associated with the user's registration (e.g., a user Internet account) (step 321). If the user does not have a digital certificate associated with the user's registration, then the smart card may be optionally registered to the user's registration (step 323). If the user has a digital certificate associated with the user's registration, then a check is made to determine whether the smart card with the digital certificate is active (step 325). If the smart card with the digital certificate is active, then the requested restricted service is accessed (e.g., web page displayed) (step 327). On the other hand, if the smart card with the digital certificate is not active, then the user cannot access the restricted service (e.g., a message to contact customer service is displayed on a web page) (step 329).

If there is no smart card in the smart card reader at step 311, then the user is prompted to insert a smart card into the smart card reader (step 331). At this point, the user either inserts a smart card or cancels the original request to use the smart card and PIN authentication method (step 333). If the smart card is inserted at step 333, then another check is made to determine whether a smart card is present in the smart card reader (step 311) and the process continues as described above. If, on the other hand, the user cancels the original request to use the smart card and PIN authentication method, then the user does not continue (e.g., the user receives a message indicating that the smart card and PIN authentication method must be used) (step 335). If the user cancels the original request to use the authentication method, then the system returns to step 301 to determine the user's predetermined method of authentication.

Figure 4:
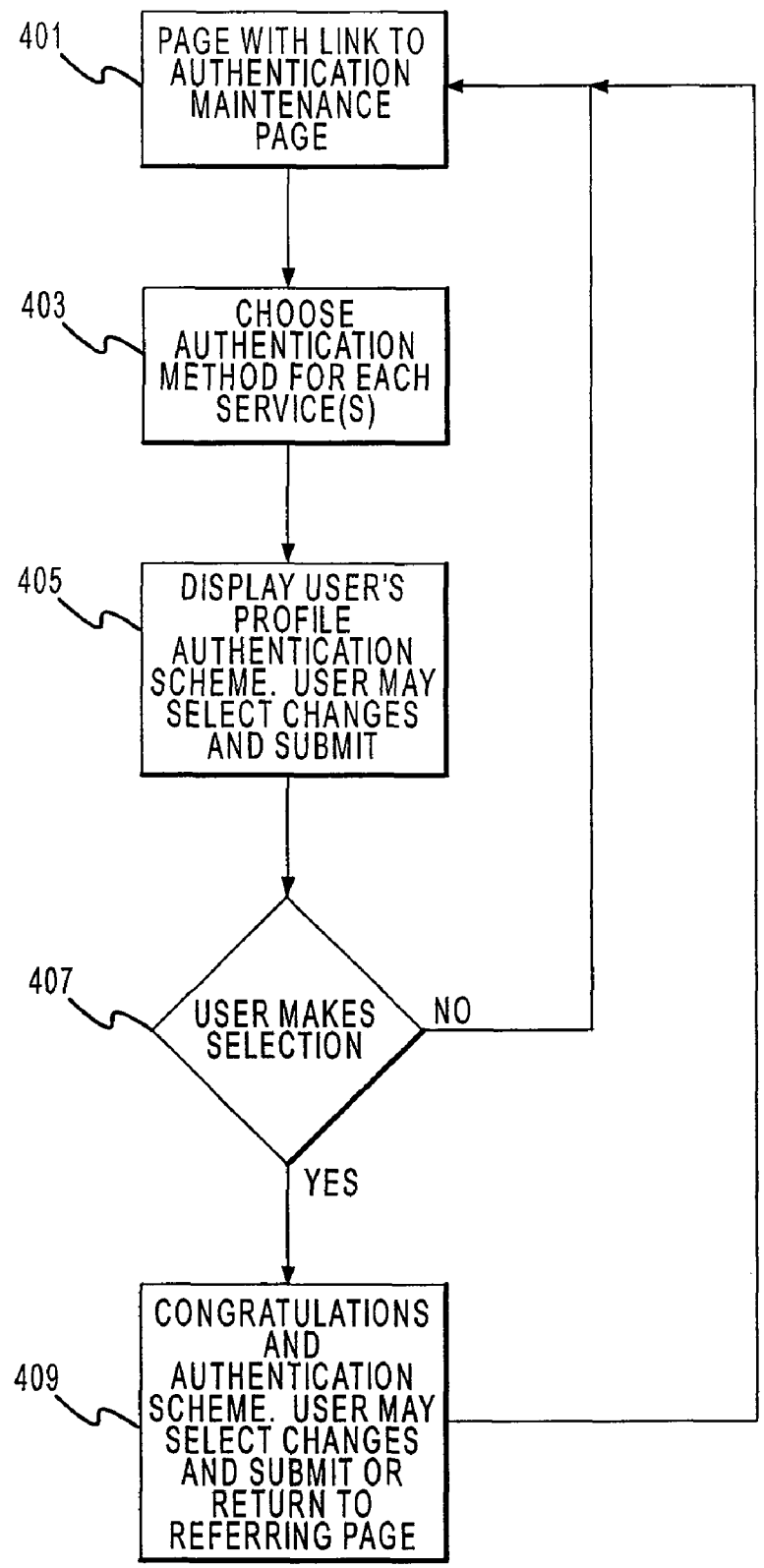
FIG. 4 is a flowchart illustrating a method for enabling a user to select an authentication method based on a particular service in accordance with an exemplary embodiment of the present invention.

The method illustrated in FIG. 3 assumes that the smart card and PIN authentication method is the user's pre-selected method of authentication for all restricted services or access. However, in another exemplary embodiment of the present invention illustrated in FIG. 4, the user may also select an authentication method based on a particular service, such that the user's pre-set authentication method is different for various restricted services or access, for different times of day, days of the year, and/or the like. In such an exemplary embodiment of the present invention, the user may access an authentication maintenance page (step 401). The user may choose an authentication method for each restricted service or access (step 403). In this way, one restricted service may be accessed via, for example, the user password and PIN authentication method while another restricted service may be accessed via, for example, the smart card and PIN authentication method. Any authentication method may be selected for any restricted service or access depending on the needs of the user. The user's profile including the authentication method chosen for each restricted service or access may be displayed, so that the user may select changes to the authentication method(s) for each restricted service or access (steps 405 and 407). If the user chooses not to make changes to the authentication method(s), then the user returns to the authentication maintenance page in step 401. If the user, however, chooses to make changes to the authentication method(s), then the changes are submitted for processing by the system (step 409). The user then returns to the authentication maintenance page in step 401.

In addition, the various authentication methods may be configured to operate based on a predetermined hierarchy or based upon multiple authentication routines. For example, the user may configure some services which require the smart card and PIN authentication method to also allow access when the user utilizes the identification and PIN authentication method. However, the user identification and PIN authentication method will not provide access to all services which require the smart card and PIN authentication method. In such an exemplary embodiment, the smart card and PIN authentication method is a higher level on the hierarchy compared to the user identification and PIN authentication method. Any authentication method may be used and may be assigned any desired level of hierarchy depending on the needs of the user.

Furthermore, if the user loses the data or information needed to access a pre-selected authentication method (e.g., the user forgets the user identification and/or password, loses the smart card, and/or the like), then the system may be configured to allow the user to change the pre-selected authentication method without accessing the restricted service. For example, if the pre-selected authentication method is smart card and PIN authentication and the user loses her smart card and/or forgets the PIN, then the user may be allowed (with certain identification and/or restrictions) to change the pre-selected authentication method to another method (e.g., user identification and password) without accessing the restricted service. In this way, the user will have the option to change the authentication method and gain access (instead of losing the opportunity to gain access due to a problem with using the pre-selected authentication method). For example, a hierarchy may be set-up such that the user may change the authentication method and gain access by providing a user identification, password, and other information. Any hierarchy may be configured in order to aid the user in changing the authentication method in order to gain access.

Figure 5:
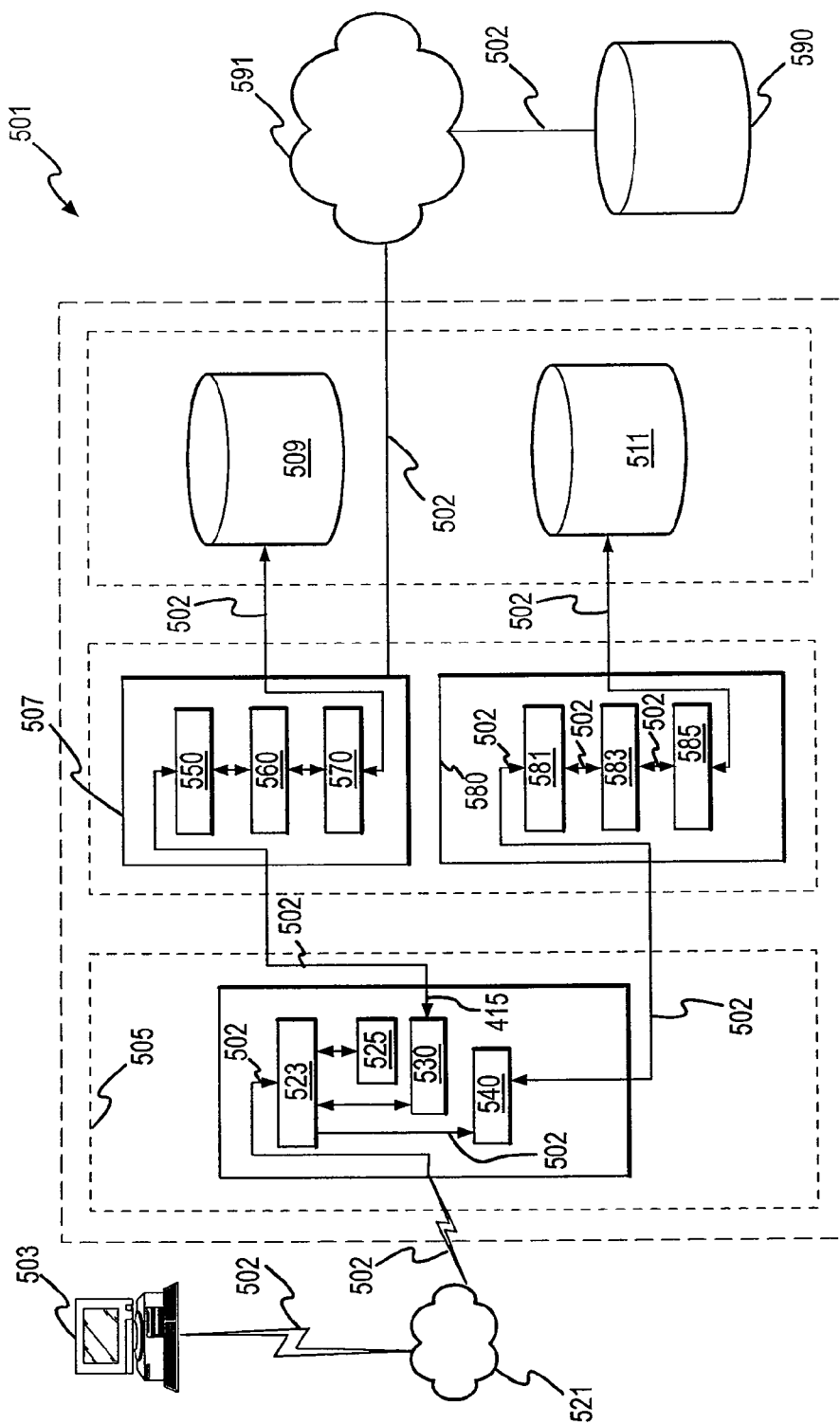
FIG. 5 illustrates a system for enabling a user to select an authentication method for accessing a restricted service in accordance with an exemplary embodiment of the present invention.

An authentication system 501 in accordance with an exemplary embodiment of the present invention is illustrated in FIG. 5. Authentication system 501 includes browser 503, web server 505, an application server 507, a security server 580, one or more communication channels 502, and one or more database servers 509, 511. Browser 503 passes input field values, e.g., using https, to web server 505. As such, browser 503 submits data to web server 505 and web server 505 sends the data to application server 507 and/or security server 580. Data from the application server 507 may be stored in and retrieved from one or more database servers 509. Data from the security server 580 may be stored in and retrieved from one or more database servers 511. Browser 503, web server 505, application server 507, security server 580, and/or one or more database servers 509, 511 may transmit the data to each other in XML format, for example, via one or more communication channels 502. Each of browser 503, web server 505, application server 507, security server 580, and/or one or more database servers 509, 511 may transfer the data and/or receive data using https and an XML format.

In such an exemplary embodiment, authentication system 501 includes a browser 503 (e.g., a user) which submits data to a web server 505 (e.g., one or more host servers, a network, and/or the like). Browser 503 may be a client computer, e.g., a machine containing interface software used by the user. Browser 503 may include PC, MAC, cell phone, PDA, kiosk and/or the like containing internet browser software, and/or network user interface software. Web server 505 may include a data center, such as a centralized server with remote failover, a distributed data center patterned after a Web Services model, one or more servers configured to receive and respond to requests from browser 503 (e.g., mircocomputer(s), mainframe), and/or the like. Communication between browser 503 and web server 505 may be via one or more communication channels 502 (e.g., an internet service provider, a network 521 (e.g., internet, intranet, extranet, wireless, VPN, Blue Tooth, LAN, WAN), a network interface between a published external access point and a web server, and/or any other means of communication). One or more communication channels 502 may include internal server communication channels that carry data from a port to web server 505 (e.g., an interprocess communication (IPC) channel).

In this manner, browser 503 may submit the user's authentication method selection information to web server 505. Web server 505 may also include web server processes 523 (e.g., programs that receive and respond to requests, such as CGIs, Java Servlets, JSP, ASP). Web server processes 523 may communicate with static content 525 (e.g., text, graphics, sound files, video, and/or the like using HTML, WML, MIME defined files, and/or the like) via one or more communication channels 502 (e.g., operating system supported file read on static content, data retrieval from a datastore, and/or the like). Web server processes 523 may also communicate with application data request handler 530 (e.g., Java Servlets, services, daemon processes, linked libraries, and/or the like) to receive and process requests for application (often dynamic) data. In addition, web server processes 523 may communicate with security data request handler 540 (e.g., Java Servlets, services, daemon processes, linked libraries, and/or the like) to receive and process requests for authentication and authorization data.

Web server 505 may also communicate with security server 580 having security data request handler 581, security business logic 583, and data request handler 585. Security server 580 can authenticate users and authorize transaction requests. Security server 580 may be a microcomputer, a mainframe, and/or the like. Security data request handler 581 may receive and process requests for authentication and authorization from security data request handler 540 via one or more communication channels 502. Security data request handler 581 may use Java Servlets, services, daemon, processes, and/or the like. Security business logic 583 processes authentication and authorization requests by requesting data from one or more database servers 511. Security business logic 583 processes the requests based on established rules and returns the request results to security data request handler 581. Security business logic 583 may use Java Servlets or programs, linked libraries, and/or the like. Data request handler 585 receives and processes requests for data from one or more database servers 511. Similar to security data request handler 581, data request handler 585 may use Java Servlets, services, daemon, processes, and/or the like. Data request handler 585 may communicate with one or more database servers 511 via one or more communication channels 502 using JDBC, CICS, LU6.2, socket, and/or the like. One or more database servers 511 may be one or more relational databases, hierarchical databases, flat files, LDAP, and/or the like. Further, one or more database servers 511 may be security data stores, e.g., any data stored to support the security rules.

Web server 505 may further communicate with application server 507 (e.g., one or more servers configured to receive and respond to requests for data from web server 505, such as a microcomputer, a mainframe, and/or the like) via one or more communication channels 502. For example, once security server 580 indicates that authentication method is valid, then web server 505 may further communicate with application server 507. One or more communication channels 502 can use sockets, CORBA, RMI, MQSeries, messaging protocol (e.g., XML, ASN, proprietary), and/or the like. For example, application server 507 may receive data from web server 505, retrieve data from one or more database servers 509, 511, process defined business logic routines, and return data to web server 505.

Application server 507 may include application data request handler 550, application business logic 560, and data request handler 570. Data request handler 550 receives and processes requests for application (often dynamic) data from application data request handler 530. Application data request handler 550 communicates with web server 505 via one or more communication channels 502. Application data request handler 550 may include Java Servlets, services, daemon processes, and/or the like.

Application server 507 may also include application business logic 560 to initiate data requests from one or more database servers 509, 511, manipulate the retrieved data as defined by established rules, and return data to application data request handler 550. Application business logic 560 may communicate with application data request handler 550 via one or more communication channels 502 (e.g., an interprocess communication channel). Application business logic 560 may include Java Servlets or programs, linked libraries, and/or the like.

Application business logic 560 may also communicate with data request handler 570 to receive and process requests from application business logic 560 for data from one or more database servers 509. Communication between data request handler 570 and application business logic 560 may use one or more communication channels 502 (e.g., an interprocess communication channel). Communication between data request handler 570 and one or more database servers 509 may also use one or more communication channels 502 (e.g., JDBC, CICS, LU6.2, socket, and/or the like). Data request handler 570 may include Java Servlets, services, daemon processes, and/or the like. Database servers 509 may include systems of record data stores (e.g., relational databases, hierarchical databases, flat files, LDAP, and/or the like).

Application server 507 may also communicate with external partner stores 590 via one or more communication channels 502, where external partner stores 590 store data. External partner stores 590 may include relational databases, hierarchical databases, flat files, LDAP, and/or the like. Security server 580 and external partner stores 590 may communicate via a third party network 591 (e.g., SSL interne, intranet, extranet, VPN, T1, and/or the like). One or more communication channels 502 between third party network 591 and external partner stores 590 may be a network interface that provides an interface between a published external access point and external partner stores 590, such as multiple interfaces when external partner stores 590 is distributed across hosting facilities.

Thus, authentication system 501 provides a system for selecting at least one authentication method for accessing a restricted service. The user and authentication system 501 may use any suitable communication means (e.g., one or more communication channels 502) to communicate (e.g., exchange data). One or more communication channels 502 may be any type of communication means which provides any form of communication between the various elements (e.g., between browser 503, web server 505, application server 507, security server 580, one or more database servers 509, 511, third party network 591, and/or external partner stores 590). It will be appreciated, that many applications of the present invention could be formulated. One skilled in the art will appreciate that one or more communication channels 502 may include any system for exchanging data or transacting business, such as any hardware and/or software communication medium (e.g., telephone, modem, digital subscriber line, a global computer network, a wired link, a wireless link, any utility link), the Internet, an intranet, an extranet, WAN, LAN, satellite communications, and/or the like. It is noted that one or more communication channels 502 may be implemented as any type of network, such as open network, secured network, an interactive television (ITV) network. Furthermore, one or more communication channels 502 may be one network or multiple independent networks. The invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, or the like.

Authentication method system 501 communicates with one or more users by transmitting, transferring, or otherwise communicating with the user(s) via one or more communication channels 502. The computing units used by the user, the system (e.g., authentication method system 501), and/or the like may be connected with each other via one or more communication channels 502 (e.g., a data communication network). The network may be a public network and assumed to be insecure and open to eavesdroppers. In the illustrated implementation, the network may be embodied as the Internet. In this context, the computers may or may not be connected to the Internet at all times. For instance, the user computer may employ a modem to occasionally connect to the Internet, whereas the system's computing center might maintain a permanent connection to the Internet. Various systems and servers are suitably coupled to the network via data links. A variety of conventional communications media and protocols may be used for data links. For example, a connection to an Internet Service Provider (ISP) over the local loop is typically used in connection with standard modem communication, cable modem, Dish networks, ISDN, Digital Subscriber Line (DSL), or various wireless communication methods. The various systems might also reside within a local area network (LAN) which interfaces to the network via a leased line (T1, D3, etc.). Such communication methods are well known in the art, and are covered in a variety of standard texts. See, e.g., GILBERT HELD, UNDERSTANDING DATA COMMUNICATIONS (1996), hereby incorporated by reference.

The system (e.g., authentication method system 501) may communicate the data to the user using at least one protocol in at least one format. For example, the system may configure the data in a format and communicate the data to the user using a protocol (e.g., using https and XML). In one exemplary embodiment of the present invention, the system and the user may have a predetermined protocol and format in order to facilitate the communication of the data between them.

Exemplary protocols include hyper text transfer protocol (http), secured hyper text transfer protocol (https), file transfer protocol, secure electronic mail, a network, remote method invocation, distributed component object model, enterprise java bean, and/or socket communication. One embodiment of the present invention may be implemented with TCP/IP communications protocols, IPX, Appletalk, IP-6, NetBIOS, OSI or any number of existing or future protocols. For a basic introduction of cryptography, please review a text written by Bruce Schneier which is entitled "Applied Cryptography: Protocols, Algorithms, And Source Code In C," published by John Wiley & Sons (second edition, 1996), which is hereby incorporated by reference. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference.

Exemplary formats include extensible markup language (XML), name value pair, any custom format, any industry standard format, and/or the like. For example, XML is a markup language for documents including structured information. Structured information includes content (e.g., words, pictures, and/or the like) and some indication of the type of content (e.g., heading, footnote, figure, database table, etc.). In this manner, a markup language can identify structures in a document (e.g., by adding markup to the document). Documents include, for example, traditional documents, vector graphics, electronic commerce transactions, mathematical equations, object meta-data, server Application Programming Interfaces, and/or the like. The XML language (e.g., XML schemas) may describe and constrain the content of XML documents.

Figure 6:
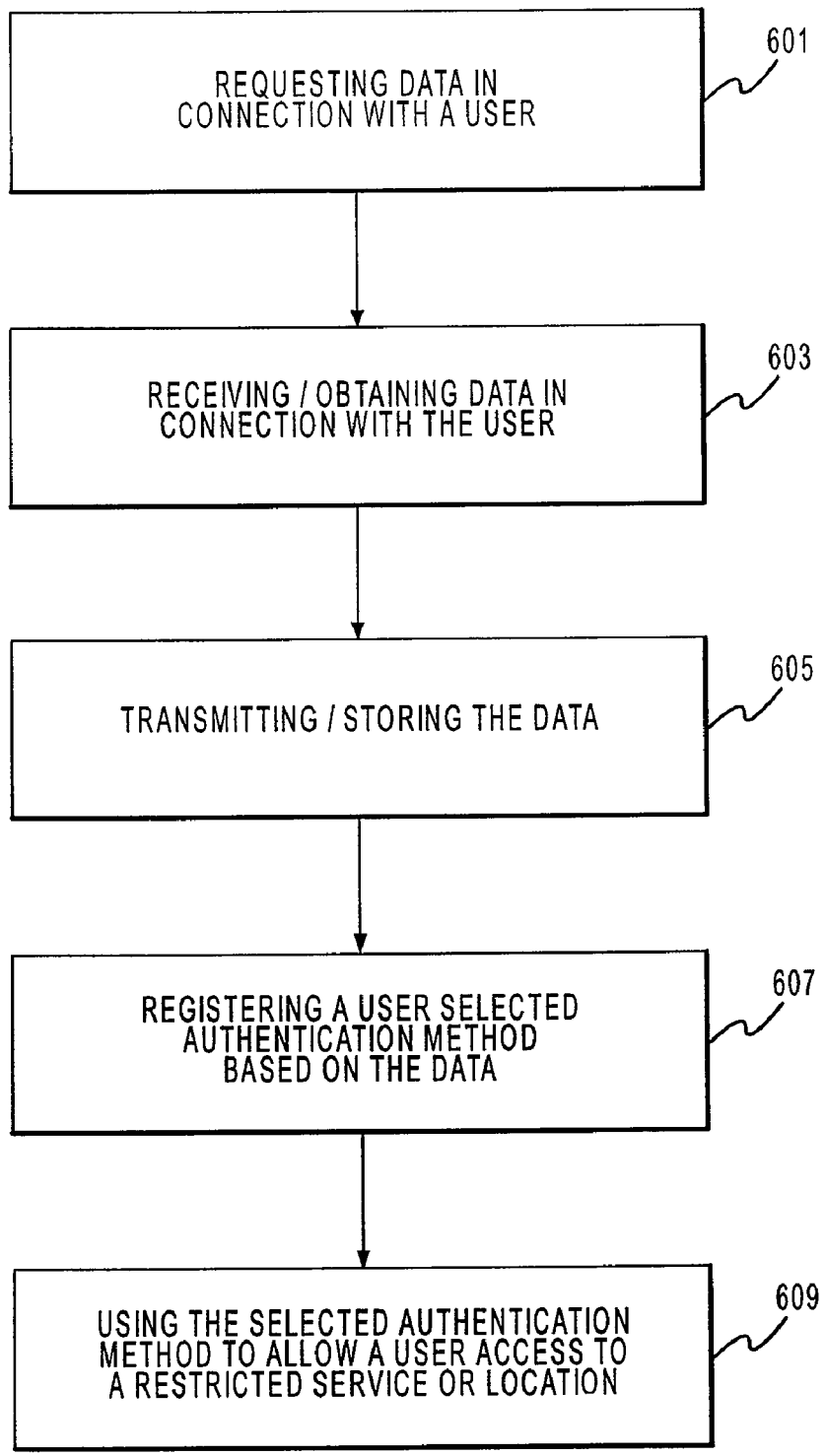
FIG. 6 is a flowchart illustrating a method for enabling a user to select an authentication method in accordance with an exemplary embodiment of the present invention.

FIG. 6 illustrates a flowchart for a method for enabling a user to select an authentication method in accordance with an exemplary embodiment of the present invention. Data may be requested in connection with a user (step 601). For example, data may be requested for a user via web server 505. Alternatively, the user may submit data to authentication system 501 via one or more communication channels 502 on its own. The data is received and/or obtained (step 603) and the data may include information regarding the user's selected authentication method for accessing a restricted service. The data may be stored or transmitted (step 605) such as, for example, the data having information regarding the user selected authentication method may be transmitted from web server 505 to application server 507. Alternatively, or in conjunction, data may be obtained on the user, where the user submits the data via one or more communication channels 502 to authentication method system 501. Authentication method system 501 may further include a memory and a processor. In this way, the data may be stored in the memory (e.g., via an input digitizer) and configured in the processor for registering the user's selected authentication method in authentication method system 501. In addition, an application program stored in the memory and accessible by the processor for directing processing of the data by the processor may be configured to perform the steps in the flowchart of FIG. 6. Accordingly, the user selected authentication method may be registered (e.g., in authentication system 501) based on the data (step 607). For example, registration may include transmitting the data from application server 507 to database servers 509, 511. Finally, the user selected authentication method is used to allow a user to access a restricted service or location (step 609). Optionally, the user selected authentication method may be required for the user to gain access to the restricted service or location. Thus, FIG. 6 illustrates a method for selecting at least one authentication method for accessing a restricted service.

In order to further describe the present invention, the following provides further exemplary embodiments for the various elements of the present invention. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in data tables. A "key field" partitions the database according to the high-level class of objects defined by the key field. For example, a certain class may be designated as a key field in both the first data table and the second data table, and the two data tables may then be merged on the basis of the class data in the key field. In this exemplary embodiment, the data corresponding to the key field in each of the merged data tables is preferably the same. However, data tables having similar, though not identical, data in the key fields may also be merged by using AGREP, for example. Also, the association of XML data is done using Document Type Definition (DTD) and schemas.

Communication between the various entities and the system of the present invention is accomplished through any suitable communication means, such as, for example, a telephone network, Intranet, Internet, point of interaction device (smart card system, point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

Each entity may use a computing system to facilitate online commerce transactions. The user may use a computing unit in the form of a personal computer, although other types of computing units may be used including laptops, notebooks, hand held computers, set-top boxes, and the like. Authentication method system 501 may use a computing unit implemented in the form of a computer server, a computing center (e.g., a main frame computer), a mini-computer, a PC server, a network set of computers, and/or the like.

Optionally, a user computing unit, an authentication method system 501 computing system, and/or the like may be interconnected via a second network, such as a payment network. The payment network represents existing proprietary networks that presently accommodate transactions for credit cards, debit cards, and other types of financial/banking cards. The payment network is a closed network that is assumed to be secure from eavesdroppers. Examples of the payment network include the American Express®, VisaNet® and the Veriphone® network.

Thus, the present invention provides methods and apparatus for enabling a user to select one or more authentication methods for accessing a restricted service or location, making e-purchases, and/or otherwise transacting in a secure environment. The present invention registers the user's pre-selected method of authentication, so that the user may set a minimum level of security for gaining access to a restricted service, for example. In this way, the user may determine the authentication method for its own login.

In the foregoing specification, the invention has been described with reference to specific embodiments. However, it will be appreciated that various modifications and changes can be made without departing from the scope of the present invention as set forth in the claims below. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented in the claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. A method comprising:
   receiving, by a computer-based system for facilitating selection of an authentication method and via a web server, data in connection with a user, wherein the data includes information regarding a first user selected authentication method for accessing a restricted service;
   transmitting, by the computer-based system, the data having information regarding the first user selected authentication method from the web server to a security server and an application server;
   registering, by the computer-based system, the first user selected authentication method by transmitting the data from the application server to a database server; and
   allowing, by the computer-based system, a change from the first user selected authentication method to a second authentication method, without accessing a first restricted service or a second restricted service, respectively, wherein the first user selected authentication method is associated with the first restricted service, and wherein the second authentication method is associated with the second restricted service.

2. The method of claim 1, further comprising authorizing the user to access a restricted service controlled by a host.

3. The method of claim 1, further comprising enabling the user to gain access to a restricted service upon validating the user's selected authentication method.

4. The method of claim 1, further comprising allowing selection of the authentication method by:
   allowing, by the computer-based system, a change from at least one of the first authentication method or the second authentication method to a third authentication method from a plurality of methods of authentication, without accessing the first restricted service or the second restricted service, respectively;
   receiving, by the computer-based system, a request for access to at least one of the first restricted service or the second restricted service;
   causing, by the computer-based system, a user interface to display input fields corresponding to the first method of authentication in response to the request being associated with the first restricted service;
   causing, by the computer-based system, the user interface to display input fields corresponding to the second method of authentication in response to the request being associated with the second restricted service; and
   granting, by the computer-based system, access to at least one of the first restricted service in response to receiving predetermined input associated with the first method of authentication or the second restricted service in response to receiving predetermined input associated with the second method of authentication.

5. The method of claim 4, wherein at least one of the first restricted service or the second restricted service is provided by a restricted service provider.

6. The method of claim 4, wherein the plurality of methods of authentication are presented by a restricted service provider.

7. The method of claim 4, wherein the plurality of methods of authentication includes at least one of: user identification and password; user identification and pass-phrase; smart card and PIN; smart card and digital certificate; biometrics; sound verification; radio frequency and password; infrared and password; or handheld computing device and digital certificate.

8. The method of claim 4, further comprising receiving a selection of more than one method of authentication, from the plurality of methods of authentication for access to the first restricted service.

9. The method of claim 4, further comprising registering at least one of the first method of authentication or the second method of authentication as a minimum level of security for access to at least one of the first restricted service or the second restricted service.

10. The method of claim 4, further comprising presenting, by the computer-based system, a query dialog box to query for selection of a level of security from a plurality of levels of security.

11. The method of claim 4, further comprising presenting, by the computer-based system, a query dialog box to query for selection of a level of security from a plurality of levels of security presented by the first restricted service provider.

12. The method of claim 10, wherein the plurality of levels of security correspond to a plurality of methods of authentication.

13. The method of claim 10, wherein the plurality of levels of security correspond to a plurality of methods of authentication, wherein the plurality of methods of authentication includes at least one of: user identification and password; user identification and pass-phrase; smart card and PIN; smart card and digital certificate; biometrics; sound verification; radio frequency and password; infrared and password; or handheld computing device and digital certificate.

14. The method of claim 10, further comprising receiving a selection of more than one level of security, from the plurality of levels of security, for access to the first restricted service.

15. The method of claim 4, further comprising receiving a selection of a fourth method of authentication, from the plurality of methods of authentication, for access to the second restricted service.

16. The method of claim 4, further comprising restricting at least one of the first method of authentication or the second method of authentication to at least one of specific times of the day, specific locations or specific days.

17. The method of claim 4, further comprising restricting at the least one of the first method of authentication or the second method of authentication to a user being a member of a specific group.

18. An article of manufacture including a non-transitory, tangible computer readable storage medium having instructions stored thereon that, in response to execution by a computer-based system for facilitating selection of an authentication method, cause the computer-based system to perform operations comprising:
receiving, by the computer-based system and via a web server, data in connection with a user, wherein the data includes information regarding a first user selected authentication method for accessing a restricted service;
transmitting, by the computer-based system, the data having information regarding the first user selected authentication method from the web server to a security server and an application server;
registering, by the computer-based system, the first user selected authentication method by transmitting the data from the application server to a database server; and
allowing, by the computer-based system, a change from the first user selected authentication method to a second authentication method, without accessing a first restricted service or a second restricted service, respectively, wherein the first user selected authentication method is associated with the first restricted service, and wherein the second authentication method is associated with the second restricted service.

19. A system comprising:
a processor for facilitating selection of an authentication method,
a tangible, non-transitory memory configured to communicate with the processor,
the tangible, non-transitory memory having instructions stored thereon that, in response to execution by the processor, cause the processor to perform operations comprising:
receiving, by the processor and via a web server, data in connection with a user, wherein the data includes information regarding a first user selected authentication method for accessing a restricted service;
transmitting, by the processor, the data having information regarding the first user selected authentication method from the web server to a security server and an application server;
registering, by the processor, the first user selected authentication method by transmitting the data from the application server to a database server; and
allowing, by the processor, a change from the first user selected authentication method to a second authentication method, without accessing a first restricted service or a second restricted service, respectively, wherein the first user selected authentication method is associated with the first restricted service, and wherein the second authentication method is associated with the second restricted service.

* * * * *